US008737695B2

(12) United States Patent
Arguelles

(10) Patent No.: US 8,737,695 B2
(45) Date of Patent: May 27, 2014

(54) PHOTOGRAPHY AUTO-TRIAGE

(75) Inventor: Carlos A. Arguelles, Shoreline, WA (US)

(73) Assignee: Microsoft Corporation, Redmond, WA (US)

( * ) Notice: Subject to any disclaimer, the term of this patent is extended or adjusted under 35 U.S.C. 154(b) by 1253 days.

(21) Appl. No.: 12/203,916

(22) Filed: Sep. 4, 2008

(65) Prior Publication Data

US 2010/0054544 A1  Mar. 4, 2010

(51) Int. Cl.
G06K 9/00  (2006.01)

(52) U.S. Cl.
USPC .......................................... 382/112; 382/275

(58) Field of Classification Search
USPC ................................................ 382/112, 275
See application file for complete search history.

(56) References Cited

U.S. PATENT DOCUMENTS

| 6,115,509 | A | 9/2000 | Yeskel |
| 7,327,891 | B2 * | 2/2008 | Covell et al. ................... 382/224 |
| 7,551,754 | B2 * | 6/2009 | Steinberg et al. ............. 382/112 |
| 7,570,831 | B2 * | 8/2009 | Shaked et al. ................. 382/260 |
| 7,577,252 | B2 * | 8/2009 | Avidan et al. ................. 380/216 |
| 8,023,155 | B2 * | 9/2011 | Jiang ............................. 358/3.22 |
| 2005/0166156 | A1 * | 7/2005 | Frigon et al. .................. 715/764 |
| 2005/0192924 | A1 | 9/2005 | Drucker et al. |
| 2005/0270381 | A1 * | 12/2005 | Owens et al. .............. 348/222.1 |
| 2006/0056673 | A1 * | 3/2006 | Dehmeshki ................... 382/131 |
| 2006/0239674 | A1 | 10/2006 | Manson et al. |
| 2007/0030364 | A1 * | 2/2007 | Obrador et al. ............... 348/241 |
| 2007/0132966 | A1 | 6/2007 | Widdowson et al. |
| 2007/0173699 | A1 | 7/2007 | Mathan et al. |
| 2008/0056611 | A1 | 3/2008 | Mathan et al. |
| 2008/0063237 | A1 * | 3/2008 | Rubenstein ................... 382/103 |
| 2009/0027732 | A1 * | 1/2009 | Imai ............................. 358/3.27 |
| 2009/0296139 | A1 * | 12/2009 | Hayaishi et al. ............. 358/1.15 |
| 2012/0185445 | A1 * | 7/2012 | Borden et al. ................ 707/690 |

OTHER PUBLICATIONS

Drucker et al., "Photo-Triage: Rapidly Annotating Your Digital Photographs", retrieved at << http://research.microsoft.com/~sdrucker/papers/phototriage.pdf>>, pp. 7, 2003.
Brank, "Image Categorization Based on Segmentation and Region Clustering", retrieved at << http://www.brank.org/dip/stairs02/brank-stairs02.pdf >>, pp. 9, 2003.
Zhang, et al., "RO-SVM: Support Vector Machine with Reject Option for Image Categorization", retrieved at << http://www.macs.hw.ac.uk/bmvc2006/papers/438.pdf >>, pp. 10, 2006.
Saha, et al., "Image Categorization and Coding Using Neural Networks and Adaptive Wavelet Filters", retrieved at << http://ieeexplore.ieee.org/iel5/6898/18559/00854168.pdf?arnumber=854168 >>, University of California Davis,pp. 438-443, 2000.

(Continued)

Primary Examiner — John Strege
(74) Attorney, Agent, or Firm — Dan Choi; Carole Boelitz; Micky Minhas

(57) ABSTRACT

In embodiments of photography auto-triage, at least a portion of each photograph in a group of photographs can be analyzed with triage filters of an auto-triage service to identify deficient photographs. The deficient photographs can be identified and then removed from the group of photographs. A compilation of triage-approved photographs is then generated, as well as a compilation of triage-removed photographs can be generated.

18 Claims, 8 Drawing Sheets

(56) References Cited

OTHER PUBLICATIONS

Drucker, et al., "Photo-Triaga: Rapidly Annotating Your Digital Photographs", http://research.microsoft.com/-sdrucker/papers/phototriape.pdf, 7, 2003.

Brank, "Image Categorization Based on Segmentationand Region Clustering", http://www.brank.org/dip/stairs02/brank-stairs02.pdf. 9, 2003.

Zhang, et al., "RO_SVM: Support Vector Machine with rejection Option for Image Categorization", http://www.macs.hw.ac.uk/bmvc2006/papers/438.pdf, 2006.

Saha, et al., "Image Categorization and Coding Using Neural Networks and Adaptive Wavelet Filters", http://ieeexplore.ieee.org/ie5/6898/18559/00854168.pdf, University of California, 438-443, 2000.

* cited by examiner

PHOTOGRAPHY AUTO-TRIAGE

BACKGROUND

Photographers will often take hundreds or thousands of photographs just to get a couple of great photos, particularly with the advent of digital photography. Sports and nature photographers are examples of photographers that may work in suboptimal conditions, shooting a moving subject, and/or working from a moving platform, such as a small boat. A photographer may take hundreds of photographs and end up with many photos that are not in sharp focus, underexposed, overexposed, and/or do not capture a moving subject. The task of reviewing and organizing hundreds or thousands of potentially bad photographs to identify three or four good ones is a very time consuming triage process for a photographer.

SUMMARY

This summary is provided to introduce simplified concepts of photography auto-triage. The simplified concepts are further described below in the Detailed Description. This summary is not intended to identify essential features of the claimed subject matter, nor is it intended for use in determining the scope of the claimed subject matter.

Photography auto-triage is described. In embodiment(s), at least a portion of each photograph in a group of photographs can be analyzed with triage filters of an auto-triage service to identify deficient photographs. A deficient photograph can be identified and then removed from the group of photographs. A compilation of triage-approved photographs can be generated by repeating a process to analyze, identify, and remove each deficient photograph from the group of photographs. In an embodiment, auto-triage assessments can be inferred from triage-removed photographs to learn identifying deficient photographs.

In other embodiment(s), the triage filters of the auto-triage service can be user-selectable to form a combination that includes an exposure filter, a dynamic range filter, a white balance filter, a sharpness filter, a vignette filter, and/or a noise filter. A photograph can be analyzed based on a region of the photograph, regions of the photograph, pixels of the photograph, pixels of a portion of the photograph, and/or random pixels of the photograph. A photograph can also be analyzed to identify subject matter in the photograph, and/or a photograph can be analyzed based on metadata that is associated with the photograph. Additionally, a photograph can be analyzed based on a combination of the triage filter(s), subject matter, and/or metadata that is associated with the photograph.

BRIEF DESCRIPTION OF THE DRAWINGS

Embodiments of photography auto-triage are described with reference to the following drawings. The same numbers are used throughout the drawings to reference like features and components.

DETAILED DESCRIPTION

Embodiments of photography auto-triage provide that a photographer can have a group of photographs that are digital images automatically analyzed to identify and remove deficient photographs from the group. This is similar to what a photographer does when manually reviewing and sorting out likely bad photographs before performing a detailed review of potentially good photographs on a larger display. Photography auto-triage simplifies the initial review of hundreds or thousands of photographs and saves photographer review time to focus on the task of reviewing the potentially good photographs.

In various embodiments, a photography auto-triage service can be customized to analyze and sort photographs based on what is acceptable for a particular user, and/or based on the objective aspects of human nature when selecting photographs to keep or delete. A group of photographs can be analyzed and each photograph can be added to either a compilation of triage-removed photographs or added to a compilation of triage-approved photographs. Because photograph analysis and decisions as to what is a bad photograph and what is a good photograph generally varies from one photographer to the next, a photographer can review the compilation of triage-removed photographs and make a final decision on whether to keep a particular photograph.

While features and concepts of the described systems and methods for photography auto-triage can be implemented in any number of different environments, systems, and/or various configurations, embodiments of photography auto-triage are described in the context of the following example systems and environments.

Figure 1:
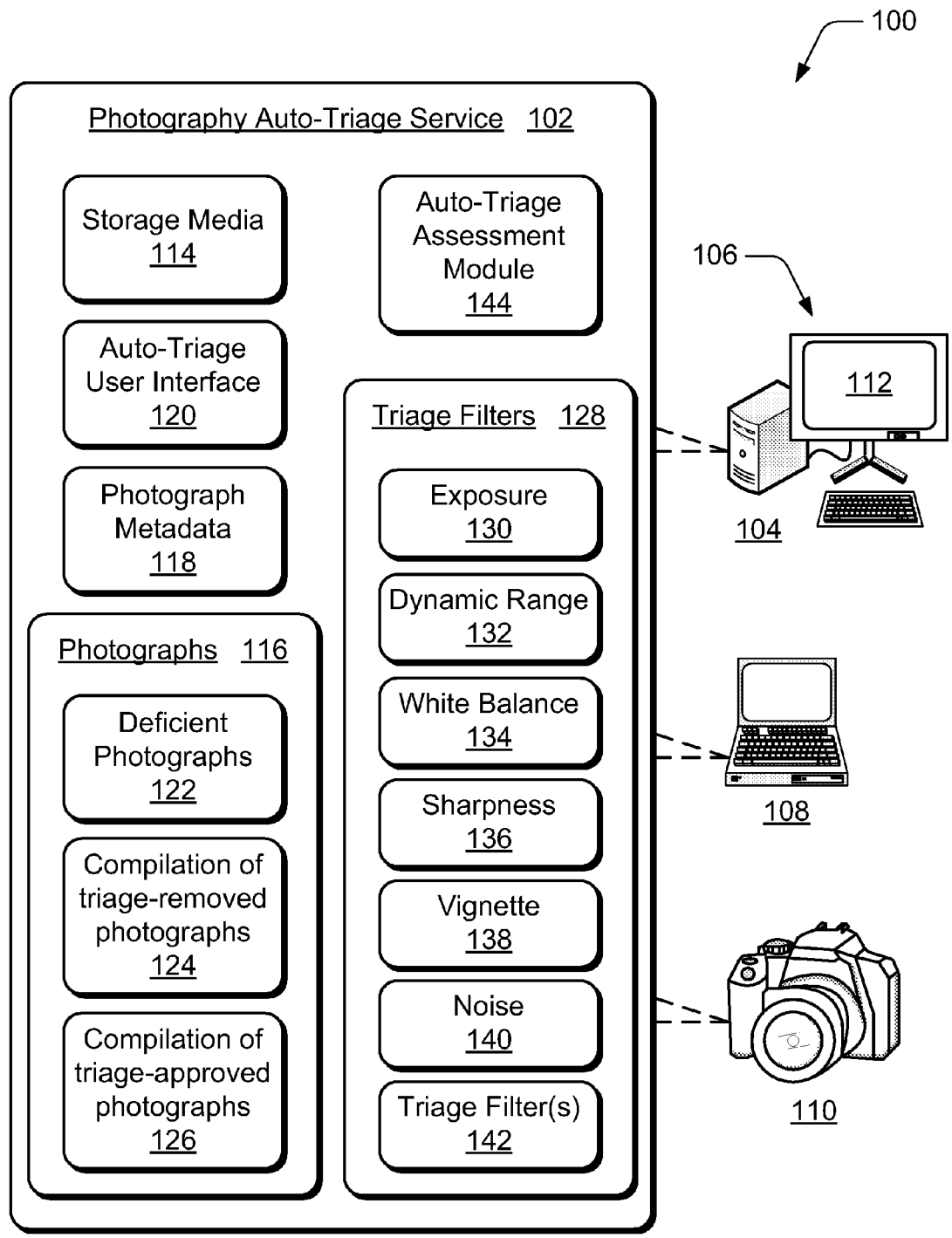
FIG. 1 illustrates example system(s) in which embodiments of photography auto-triage can be implemented.

FIG. 1 illustrates an example system 100 in which various embodiments of photography auto-triage can be implemented. In this example, system 100 includes a photography auto-triage service 102 that can be implemented in various devices, such as a computer 104 in a computer system 106, a mobile computing device 108, and/or a digital camera 110. The computer system 106 includes a display device 112 to display an auto-triage user interface, and can be implemented as any type of a television, high definition television (HDTV), LCD, or similar display system. Similarly, the mobile computing device 108 and the digital camera 110 each include an integrated display device to display an auto-triage user interface.

Any of the devices that implement the photography auto-triage service 102 can be implemented with one or more processors, communication components, memory components, signal processing and control circuits, and a display system. The various devices can also be implemented with any number and combination of differing components as further described with reference to the example device shown in FIG. 12. A device may also be associated with a user (i.e., a person) and/or an entity that operates the device such that a device describes logical devices that include users, software, and/or a combination of devices.

In example system 100, the photography auto-triage service 102 includes storage media 114 to store or otherwise maintain photographs 116 as digital images, and maintain photograph metadata 118 that is associated with the respective photographs 116. The storage media 114 can be implemented as any type of memory, random access memory (RAM), read only memory (ROM), any type of magnetic or optical disk storage, and/or other suitable electronic data storage. The photography auto-triage service 102 also includes an auto-triage user interface 120 to display photographs 116 on display device 112 of the computer system 106 and/or on the integrated display devices of the mobile computing device 108 and the digital camera 110. The auto-triage user interface 120 can also be utilized to initiate features of photography auto-triage. In addition, the photography auto-triage service 102 can be implemented with any number and combination of differing components as further described with reference to the example service shown in FIG. 11.

The photography auto-triage service 102 can be implemented to automatically analyze a group of the photographs 116 to identify and remove deficient photographs 122 from the group. This is similar to what a photographer does when reviewing and sorting out likely bad photographs before performing a detailed review of potentially good photographs on a larger display. In various embodiments, some of the photographs 116 are identified as the deficient photographs 122 based on technical deficiencies and/or user-selectable thresholds of various analytical criteria. The photography auto-triage service 102 can be customized to analyze and sort the photographs 116 based on what is acceptable for a particular user.

The group of photographs 116 can be analyzed and each photograph can then be added to either a compilation of triage-removed photographs 124 or added to a compilation of triage-approved photographs 126. Because photograph analysis and decisions as to what is a bad photograph and what is a good photograph generally varies from one photographer to the next, a photographer can review the compilation of triage-removed photographs 124 and make a final decision on whether to keep a particular photograph. For example, a photographer can tag or otherwise identify a deficient photograph that has been added to the compilation of triage-removed photographs 124, and the photograph can then be moved or added to the compilation of triage-approved photographs 126. Similarly, a photograph that has been approved can be moved or added to the compilation of triage-removed photographs 124.

In an embodiment of the photography auto-triage service 102 implemented on the digital camera 110, a photograph that is identified as a deficient photograph 122 can be deleted to conserve memory space, rather than being added to the compilation of triage-removed photographs 124. In addition, the photography auto-triage service 102 can be implemented to analyze photographs as each photograph is taken or imaged, rather than first compiling a group of photographs and then analyzing the group.

In the example system 100, the photography auto-triage service 102 includes triage filters 128 that can be implemented as computer-executable instructions and executed by processor(s) to implement various embodiments and/or features of photography auto-triage. The triage filters 128 can analyze at least a portion of each photograph in a group of photographs 116 to identify and remove the deficient photographs 122 from the group. The triage filters 128 can analyze the photographs 116 (or portions thereof) based on image analysis algorithms and/or mathematical formulas. The various triage filters 128 can be implemented to analyze any one or combination of a region of a photograph, regions of the photograph, pixels of the photograph, pixels of a portion of the photograph, random pixels of the photograph, and/or vectors of the photograph.

The triage filters 128 that implement a pixel-based analysis of the photographs, or regions of the photographs, can be slowed when analyzing large images. For example, a large image may be 4,368 pixels by 2,912 pixels which can result in 12,719,616 operations to analyze the pixels of a photograph. A triage filter analysis can be accelerated by choosing random, uniformly distributed pixels throughout the photograph rather than analyzing each individual pixel. The photography auto-triage service 102 can include a speed-vs.-accuracy selector that provides user control of triage filter pixel analysis. For an accuracy selection of 100%, the photography auto-triage service analyzes each individual pixel of a photograph. When selecting faster analysis and correspondingly less accuracy, less pixels of the photograph are analyzed and the pixels are selected randomly from throughout the photograph, or a region of the photograph.

In various embodiments, the triage filters 128 include an exposure filter 130, a dynamic range filter 132, a white balance filter 134, a sharpness filter 136, an vignette filter 138, a noise filter 140, and/or other photograph triage filters 142. Any one or more of the triage filters 128 can be combined to analyze a photograph 116 and identify a potentially deficient photograph. In various embodiments, the other photograph triage filters 142 can include third-party plug-in filters that interface with the photography auto-triage service 102 via an API (application programming interface) that receives a bitmap object and returns a confidence level to accept a photograph. Various settings can also be entered via the API, such as high and low boundaries.

The exposure filter 130 can be implemented to identify a photograph 116 that is underexposed or overexposed based on histogram data. The dynamic range filter 132 can be implemented to identify a photograph 116 that has both underexposed areas and overexposed areas based on histogram data. The white balance filter 134 can be implemented to calculate the distance between a red histogram and a blue histogram for a particular photograph 116. The sharpness filter 136 can be implemented to identify a photograph 116 that does not appear to have a sharp image based on pixel contrast. The vignette filter 138 can be implemented to identify a photograph 116 that has darker and/or faded corners based on histogram data. The noise filter 140 can be implemented to analyze occurrences of pattern areas and grain for a particular photograph 116.

In various embodiments, the other photograph triage filters 142 can include a subject matter filter and/or a metadata filter. A subject matter filter can be implemented to analyze the photographs 116 to identify or detect subject matter in the photographs, such as a human face or any other type of photographic subject matter. A metadata filter can be implemented to analyze the photographs 116 based on the photograph metadata 118 that is associated with a respective photograph 116. In an embodiment, a photograph 116 can be analyzed based on both image analysis (such as histogram inference) and metadata 118 that is associated with the photograph (such as aperture and shutter speed) for photography auto-triage.

In one example, the photograph metadata 118 for a respective photograph 116 can include: histogram data; triage scores from the various auto-triage filters 128 (e.g., an exposure score, a sharpness score, and the like); lens information such as a minimum range of the lens (e.g., 24 mm), a maximum range of the lens (e.g., 105 mm), a minimum aperture of the lens (e.g., f/4), a maximum aperture of the lens (e.g., f/32); the focal length (e.g., 72 mm); a shutter speed (e.g., 1/125th of a second); the aperture (e.g., f/5.6); the ISO film speed (e.g., ISO100); the focus mode; the drive mode (e.g., single-frame shooting); the metering mode; the camera type and serial number; the exposure mode (e.g., manual, aperture priority, etc.); the date and/or time; whether a flash was used; and/or exposure compensation.

A photographer can activate, initiate, or enable any combination of the triage filters 128 via the auto-triage user interface 120. When a particular triage filter 128 is activated to analyze the photographs 116, the triage filter analyzes a photograph and generates a voting input as to whether the photograph should be added to the compilation of triage-removed photographs 124, or added to the compilation of triage-approved photographs 126. In an embodiment, the voting input of a triage filter can be recognized as a confidence level between zero (0) and one (1) that reflects a degree as to whether the photograph should be approved based on the current settings. For example, a photograph may be analyzed by the exposure filter 130 and the sharpness filter 136 that each return confidence levels that are normalized, such as 0.8/1.0 for the exposure filter and 0.9/1.0 for the sharpness filter.

In a further embodiment, the triage filters 128 can be weighted such that one photographic aspect is given more weight than another when analyzing a photograph. For example, the exposure filter 130 may have a weight of 0.6 and the sharpness filter may have a weight of 0.3. A total normalized confidence for the exposure filter 130 having a weight of 0.3 and a confidence level of 0.8, and for the sharpness filter having a weight of 0.3 and a confidence level of 0.9, would be (0.8*0.6)+(0.9*0.4)=0.48+0.36=0.84. The weights for the triage filters 128 can be user-selectable to account for photographer preferences, and in this example, the exposure of a photograph has a higher weight, or is more of a determining factor, than the sharpness of the photograph.

In another embodiment, a selection threshold can be established as a threshold for the final normalized confidence when the triage filters 128 analyze a photograph. For example, the selection threshold may be set at 0.7 and the final normalized confidence in the above example is 0.84. Accordingly, the analyzed photograph would be added to the compilation of triage-approved photographs 126. In various embodiments, a user can override the analysis of a photograph by the triage filters 128 and identify the photograph as approved or removed regardless of the auto-triage analysis.

In the example system 100, the photography auto-triage service 102 includes an auto-triage assessment module 144 that can be implemented as computer-executable instructions and executed by processor(s) to implement various embodiments and/or features of photography auto-triage. In an embodiment, the auto-triage assessment module 144 can infer auto-triage assessments from the compilation of triage-removed photographs 124 to learn identifying the deficient photographs 122 and/or the preferences of a particular photographer. The auto-triage assessment module 144 can implement Bayesian inference techniques to learn user preferences from past approved and removed photograph selections. In an embodiment, an output of the auto-triage assessment module 144 can be utilized to improve photography auto-triage and/or as a final weight determiner when analyzing the photographs 116.

Figure 2:
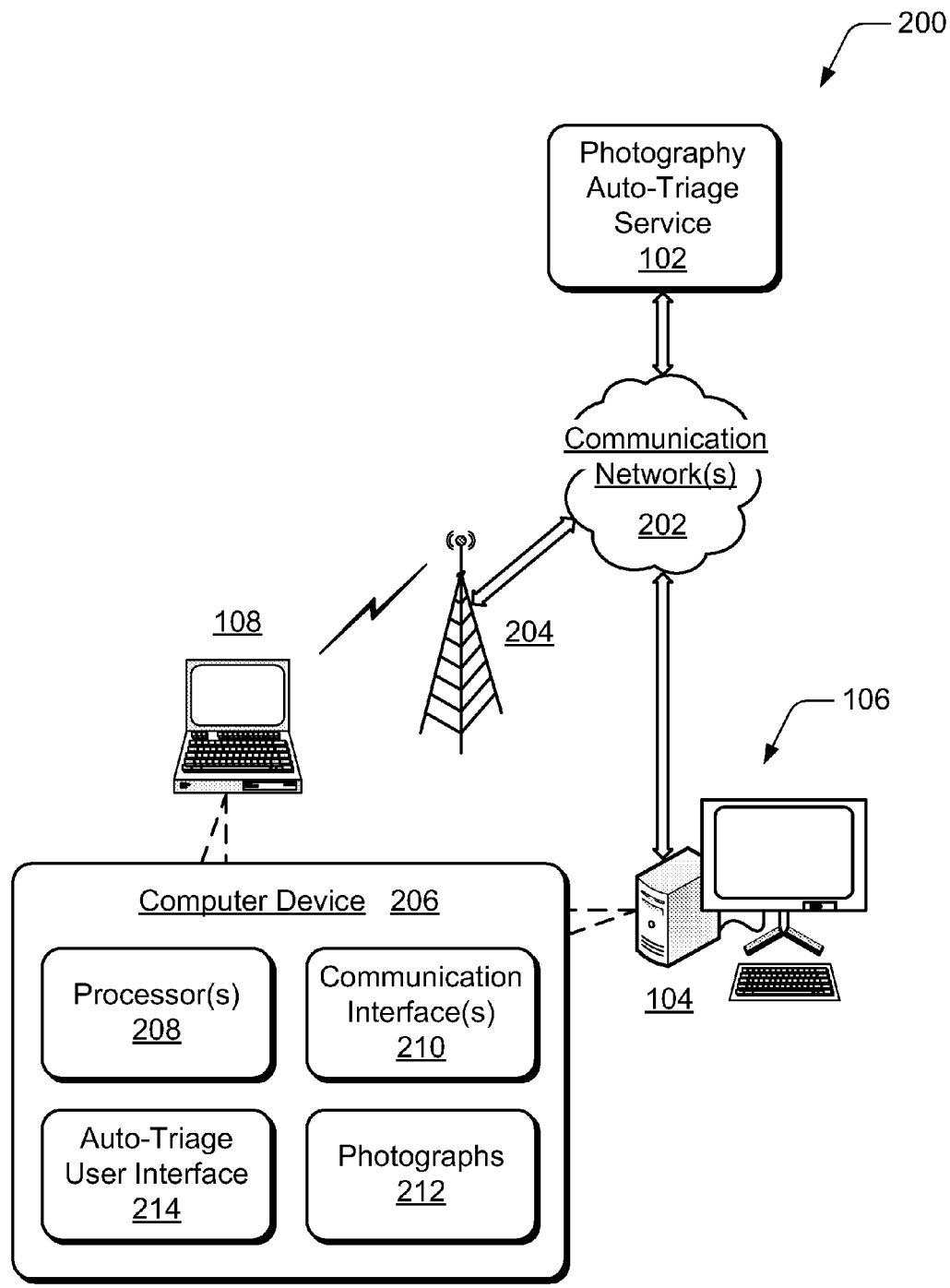
FIG. 2 illustrates other example system(s) in which embodiments of photography auto-triage can be implemented.

FIG. 2 illustrates an example system 200 in which various embodiments of photography auto-triage can be implemented. System 200 includes the photography auto-triage service 102, the computer system 106 that includes computer 104, and mobile computing device 108 as described with reference to FIG. 1. In this example system 200, the photography auto-triage service 102 can be implemented as an independent, networked service (e.g., on a separate server or by a third party service). In addition, the photography auto-triage service 102 can be implemented as a subscription-based service to provide features of photography auto-triage.

The photography auto-triage service 102, computer 104, and mobile computing device 108 can all be implemented for communication with each other via communication network(s) 202 and/or a wireless network 204. The communication network(s) 202 can be implemented to include any type of data network, voice network, broadcast network, an IP-based network, a wide area network (e.g., the Internet), and/or wireless network 204 that facilitates data communication between the photography auto-triage service 102 and any number of various computer devices. The communication network(s) 202 can also be implemented using any type of network topology and/or data communication protocol, and can be represented or otherwise implemented as a combination of two or more networks. Any one or more of the arrowed communication links facilitate two-way data communications, such as from the photography auto-triage service 102 to a computer device and vice-versa.

System 200 includes a computer device 206 that is representative of computer 104 and/or mobile computing device 108. The computer device 206 can be implemented with processing, communication, and memory components, as well as signal processing and control circuits. The computer device 206 may also be associated with a user, owner, or photographer (i.e., a person) and/or an entity that operates the device such that the computer device represents logical devices that include users, software, and/or a combination of devices.

In this example, the computer device 206 includes one or more processors 208 (e.g., any of microprocessors, controllers, and the like), and communication interface(s) 210 to receive and/or communicate data with the photography auto-triage service 102 via the communication networks 202 and/or the wireless network 204. The computer device 206 can also include a device manager or controller (e.g., a control application, software application, signal processing and control module, etc.).

The computer device 206 also includes photographs 212 as digital images that may include deficient photographs, a compilation of triage-approved photographs, a compilation of triage-removed photographs, and/or photographs that have not been triaged as described with reference to FIG. 1 and the features of photography auto-triage. The computer device 206 also includes an auto-triage user interface 214 (or an instantiation of auto-triage user interface 120) to display the photographs 212 and initiate features of photography auto-triage.

Figure 3:
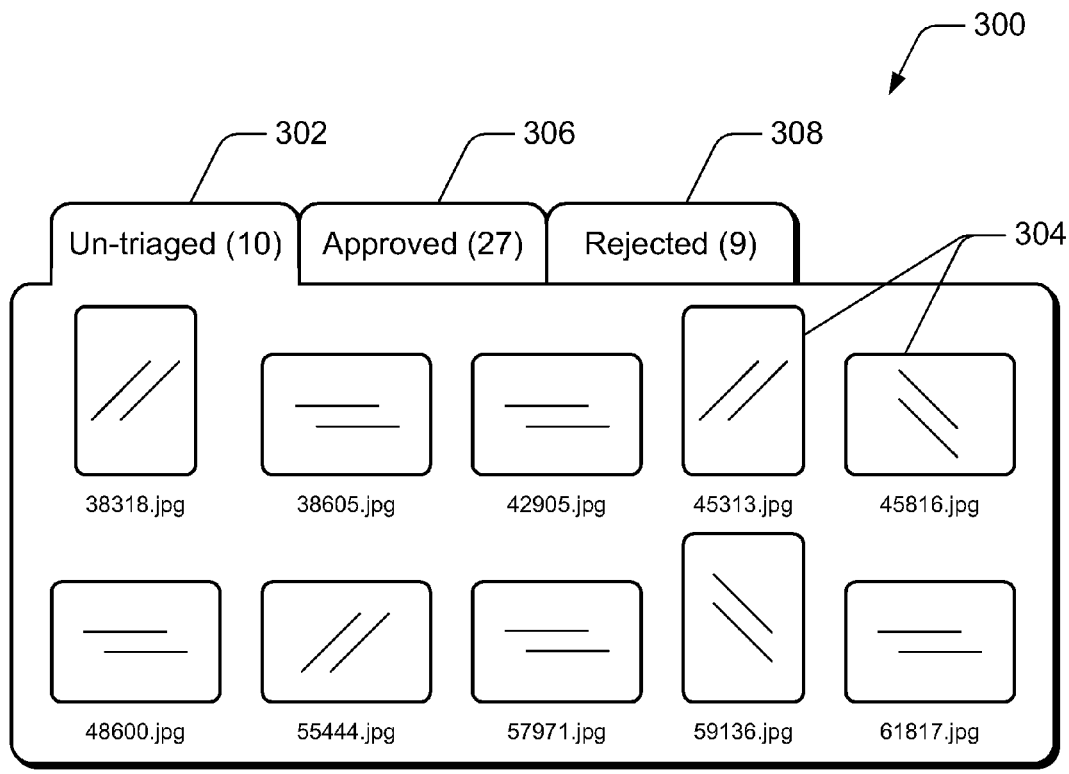
FIG. 3 illustrates an example auto-triage user interface that can be implemented in embodiments of photography auto-triage.

FIG. 3 illustrates an example of an auto-triage user interface 300 that can be implemented in various embodiments of photography auto-triage. In an embodiment, the auto-triage user interface 300 is representative of a component or portion of the auto-triage user interface 120 shown in FIG. 1. The auto-triage user interface 300 includes user-selectable tabs to select un-triaged photographs, approved photographs, and rejected photographs. An un-triaged tab 302 is selectable to display thumbnail images 304 of photographs that have not been triaged, or that have been staged for auto-triage. The un-triaged tab 302 indicates that ten (10) photographs have not been triaged.

An approved tab 306 is selectable to display thumbnail images of photographs that have been approved by a photography auto-triage service. The approved tab 306 indicates that twenty-seven (27) photographs have been approved, and the approved photographs are representative of the compilation of triage-approved photographs 126 shown in FIG. 1. A rejected tab 308 is selectable to display thumbnail images of photographs that have been rejected by a photography auto-triage service. The rejected tab 308 indicates that nine (9) photographs have been rejected, and the rejected photographs are representative of the compilation of triage-removed photographs 124 shown in FIG. 1. The auto-triage user interface 300 can display the compilation of triage-approved photographs (e.g., the thumbnail images) that remain in a group of photographs after the deficient photographs are removed, and can display the compilation of triage-removed photographs (e.g., the thumbnail images thereof).

In an embodiment, photographs can be staged as un-triaged and thumbnail images of the photographs displayed in the un-triaged tab 302. The photographs can then be moved or added (manually or automatically) to the approved tab 306 or to the rejected tab 308 as the photographer and/or the photography auto-triage service analyze the photographs. A photographer can manually approve or reject a photograph and/or move a photograph back to the un-triaged tab 302.

Figure 4:
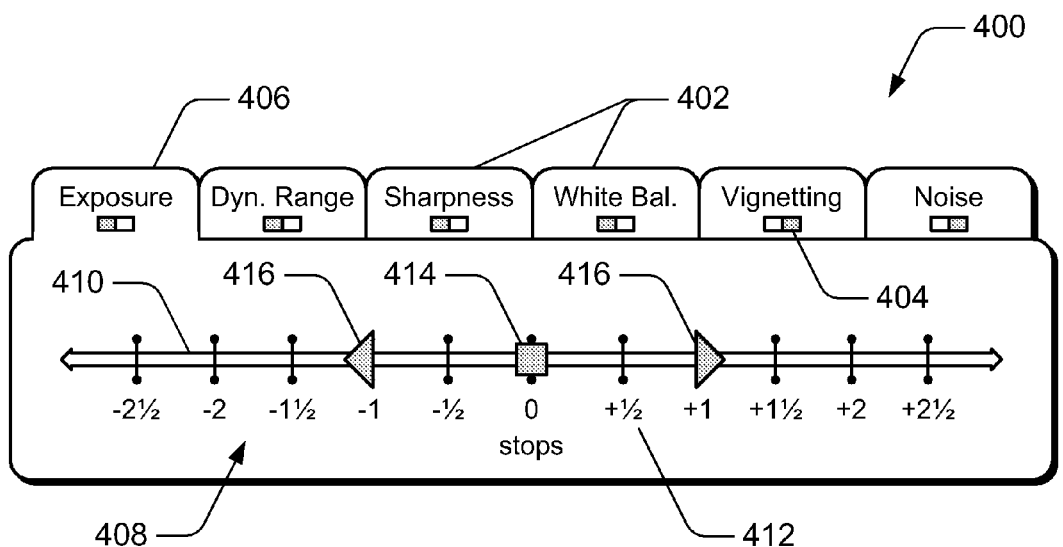
FIGS. 4-9 illustrate examples of user interfaces for auto-triage filters that can be implemented in embodiments of photography auto-triage.

FIG. 4 illustrates a triage filter user interface 400 that can be implemented in various embodiments of photography auto-triage. In an embodiment, the triage filter user interface 400 is representative of a component or portion of the auto-triage user interface 120 shown in FIG. 1. The triage filter user interface 400 includes user-selectable tabs 402 that each correspond to a different auto-triage filter, such as each of the triage filters 128 shown in FIG. 1. The user-selectable tabs 402 each include a selectable on/off switch 404 to enable or disable a corresponding auto-triage filter, and to customize triage filter combinations to auto-triage photographs. In this example, the auto-triage exposure filter, dynamic range filter, sharpness filter, and white balance filter are turned on, while the vignetting filter and the noise filter are turned off.

An exposure tab 406 displays an exposure filter user interface 408 that corresponds to an implementation of the exposure auto-triage filter 130 that is implemented to identify a photograph that is underexposed or overexposed based on histogram data. The exposure filter 130 can calculate how close the histogram values are to the edges of a histogram graph to determine if the photograph is underexposed (e.g., histogram curve shifted left towards shadows), or if the photograph is overexposed (e.g., histogram curve shifted right towards highlights).

The exposure filter user interface 408 includes a sliding scale 410 of stop points 412, a middle-point selectable indicator 414, and selectable range indicators 416. The middle-point and exposure range can be adjusted for photographer preferences, such as for a lighter or darker appearance of a photograph. Alternatively or in addition, the middle-point and exposure range can be adjusted to compensate if a photograph includes a naturally lighter subject, such as snow, or includes a darker subject matter, such as a person performing on a dark stage. The sliding scale 410 provides customization to analyze and detect particular photographic variations.

In various embodiments, the sliding scale implementations of the triage filter user interfaces (i.e., that correspond to each of the user-selectable tabs 402) provides an interactive auto-triage service that can be manipulated or adjusted to generate a manageable number of triage-approved images. In various embodiments, the un-triaged photographs can be analyzed more than once with different combinations of auto-triage filters enabled and/or with different sliding scale settings to compare the outcomes of the photographs that are triage-approved or triage-removed. Alternatively or in addition, a first combination and setting of auto-triage filters can analyze the un-triaged photographs to generate the compilation of triage-approved photographs, and then as second combination and setting of auto-triage filters can analyze just the compilation of triage-approved photographs.

Figure 5:
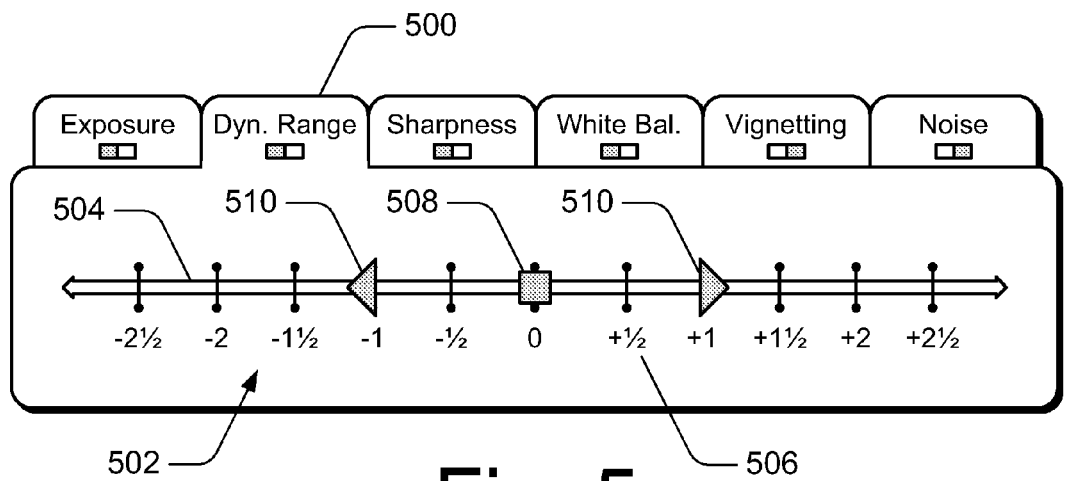

FIG. 5 further illustrates the triage filter user interface 400 and a dynamic range tab 500 that displays a dynamic range user interface 502 when selected. The dynamic range user interface 502 corresponds to an implementation of the dynamic range auto-triage filter 132 that is implemented to identify a photograph that has both underexposed areas and overexposed areas based on histogram data. The dynamic range filter 132 can analyze whether a photograph has histogram values that are clipped on both sides of a histogram graph to determine if the photograph has both underexposed areas and overexposed areas that correspond to dark areas and bright areas in the same photograph. The dynamic range user interface 502 includes a sliding scale 504 of stop points 506, a middle-point selectable indicator 508, and selectable range indicators 510. The middle-point and dynamic range can be adjusted for photographer preferences and/or to compensate for photographic variations.

Figure 6:
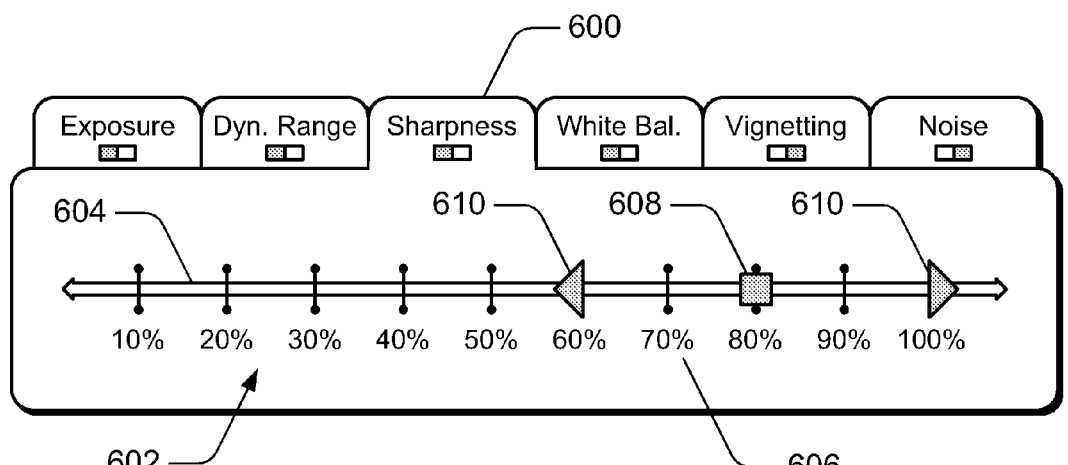

FIG. 6 further illustrates the triage filter user interface 400 and a sharpness tab 600 that displays a sharpness user interface 602 when selected. The sharpness user interface 602 corresponds to an implementation of the sharpness auto-triage filter 136 that is implemented to identify a photograph that does not appear to have a sharp image based on pixel contrast. The sharpness filter 136 can analyze the contrast between adjacent pixels in a photograph and, in an embodiment, evaluate associated image metadata. For example, a relationship between shutter speed and lens focal length can affect the weight given to the analysis.

Aperture metadata can also be evaluated because images generated with a smaller aperture can be expected to have a larger percentage on focus. For example, if a photograph is imaged at f/16 and only 10% of the photograph is deemed sharp, the photograph would be triage-removed, whereas if the photograph is imaged at f/2.8 and the same amount of the photograph is sharp, then the image would be triage-approved at the same threshold. In addition, the minimum and maximum aperture of the lens can be evaluated, as well as the minimum and maximum focal length of a zoom lens. The sharpness user interface 602 includes a sliding scale 604 of percentages 606, a middle-point selectable indicator 608, and selectable range indicators 610. The middle-point and sharpness range can be adjusted for photographer preferences and/or to compensate for photographic variations.

Figure 7:
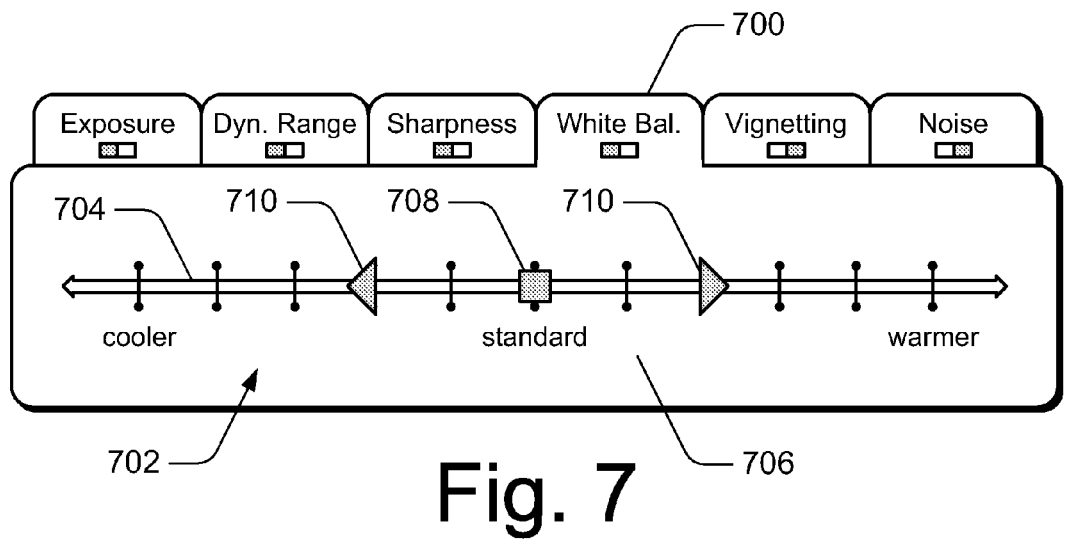

FIG. 7 further illustrates the triage filter user interface 400 and a white balance tab 700 that displays a white balance user interface 702 when selected. The white balance user interface 702 corresponds to an implementation of the white balance auto-triage filter 134 that is implemented to calculate the distance between a red histogram and a blue histogram for a particular photograph. Generally, a photograph is white-balanced when the red histogram and the blue histogram line up, and a zero distance indicates that the photograph is white-balanced. When the blue histogram is shifted to the left over the red histogram, this indicates that the photograph has a cool appearance, whereas the red histogram shifted over to the left would indicate that the photograph has a warm appearance. A photographer may have a preference for a warmer or cooler appearance in a photograph, or the subject matter may have a naturally warm appearance, such as a sunset. The white balance user interface 702 includes a sliding scale 704 of appearance 706, a middle-point selectable indicator 708, and selectable range indicators 710. The middle-point and white balance range can be adjusted for photographer preferences and/or to compensate for photograph subject matter.

Figure 8:
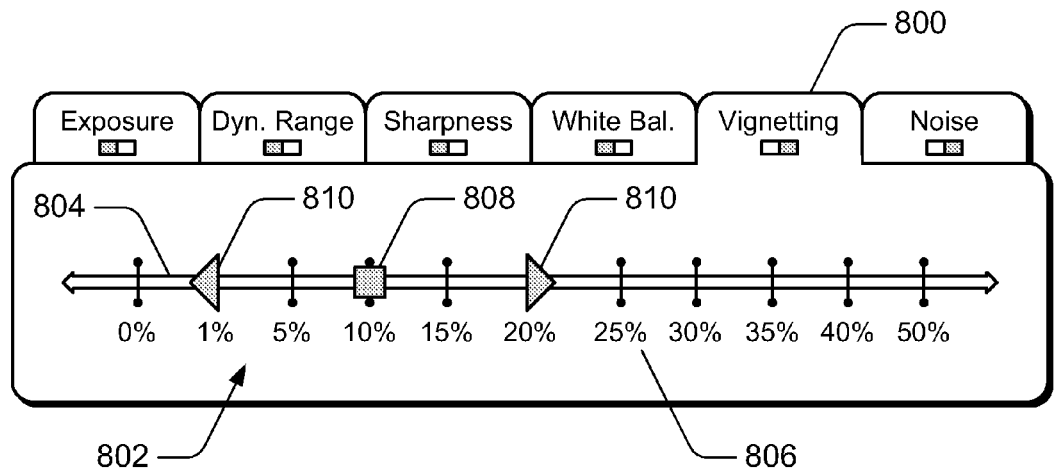

FIG. 8 further illustrates the triage filter user interface 400 and a vignetting tab 800 that displays a vignetting user interface 802 when selected. The vignetting user interface 802 corresponds to an implementation of the vignette auto-triage filter 138 that is implemented to identify a photograph that has darker and/or faded corners based on histogram data and, in an embodiment, evaluates associated image metadata. For example, the vignette filter 138 can utilize the focal length (e.g., a wider angle is more likely to vignette), the aperture (e.g., wide open is more likely to vignette), and the focal length in relationship to minimum and maximum focal length of the lens (e.g., the lens is more likely to cause vignette at its extremes than in the middle). These heuristics can be utilized to provide a weight to the results of a corner-histogram analysis. The vignetting user interface 802 includes a sliding scale 804 of vignetting percentage 806, a middle-point selectable indicator 808, and selectable range indicators 810. The middle-point and vignetting range can be adjusted for photographer preferences and/or to compensate for photographic variations.

Figure 9:
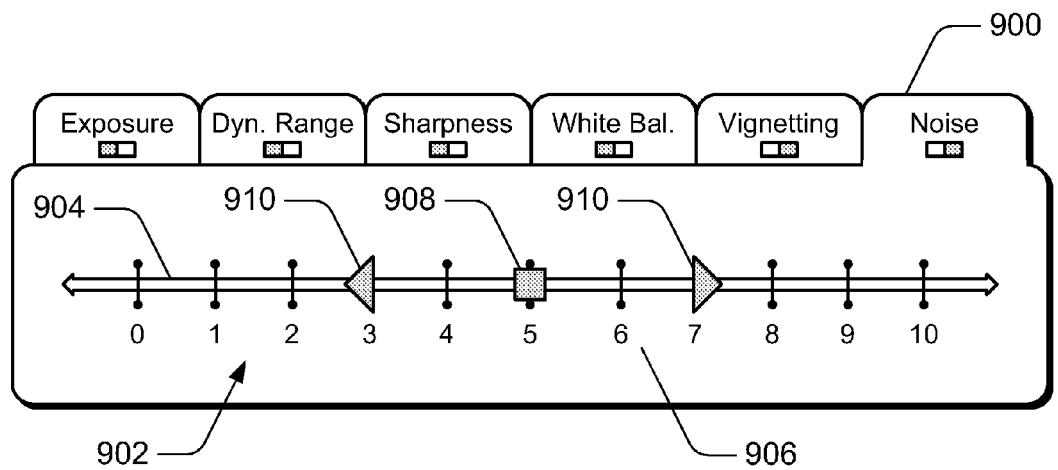

FIG. 9 further illustrates the triage filter user interface 400 and a noise tab 900 that displays a noise user interface 902 when selected. The noise user interface 902 corresponds to an implementation of the noise auto-triage filter 140 that is implemented to analyze occurrences of pattern areas and grain for a particular photograph and, in an embodiment, evaluates associated image metadata. The noise user interface 902 includes a sliding scale 904 of various scale points 906, a middle-point selectable indicator 908, and selectable range indicators 910. The middle-point and noise range can be adjusted for photographer preferences and/or to compensate for photographic variations.

Example method 1000 is described with reference to FIG. 10 in accordance with one or more embodiments of photography auto-triage. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a processor. Example method 1000 may be described in the general context of computer-executable instructions. Generally, computer-executable instructions can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 10:
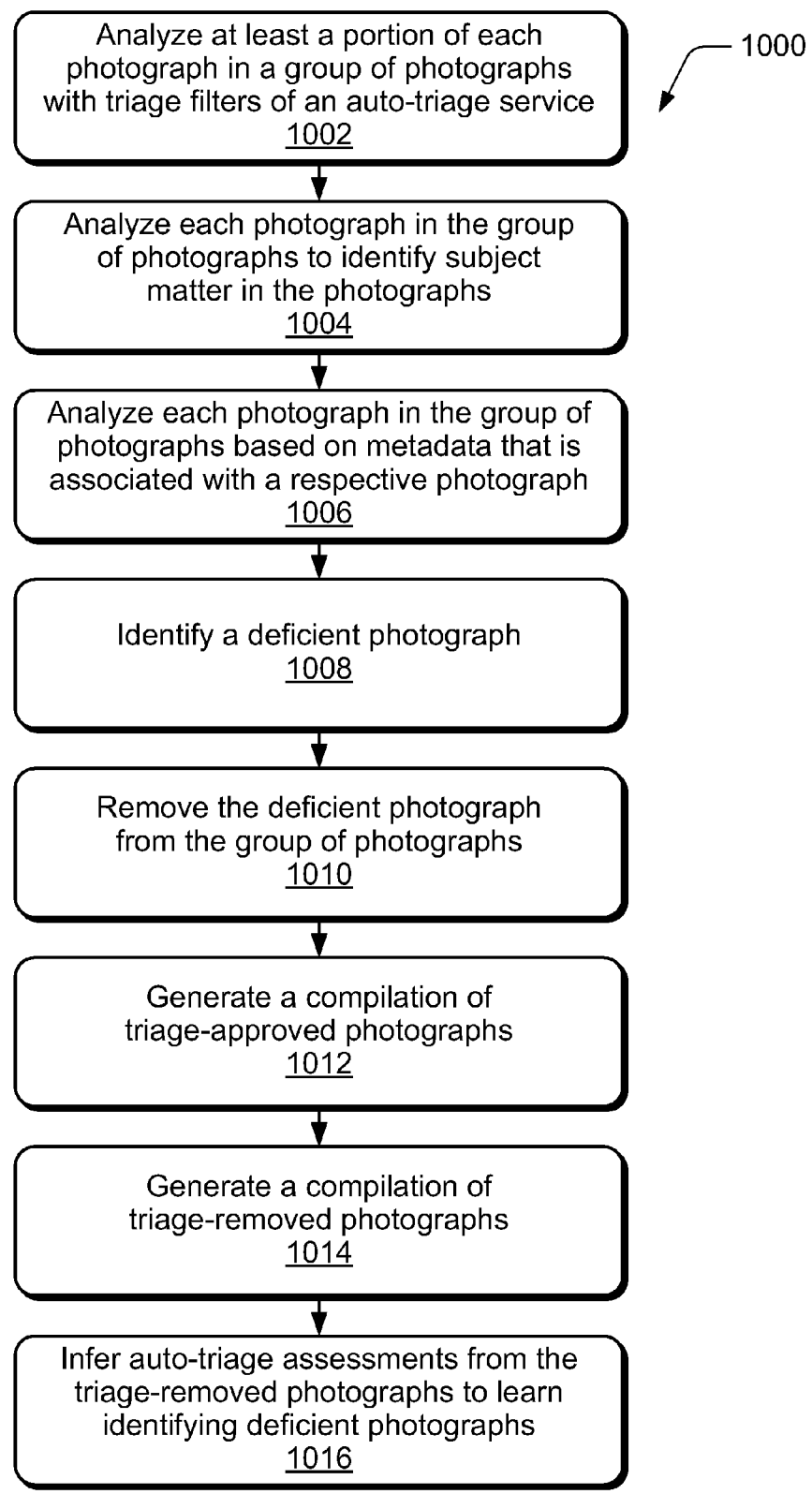
FIG. 10 illustrates example method(s) for photography auto-triage in accordance with one or more embodiments.

FIG. 10 illustrates example method(s) 1000 of photography auto-triage, and is described with reference to a photography auto-triage service. The order in which the method is described is not intended to be construed as a limitation, and any number of the described method blocks can be combined in any order to implement the method, or an alternate method.

At block 1002, at least a portion of each photograph in a group of photographs is analyzed with triage filters of an auto-triage service. For example, the triage filters 128 of the photography auto-triage service 102 (FIG. 1) analyze at least a portion of each photograph in the group of photographs 116 to identify and remove the deficient photographs 122 from the group. The triage filters 128 analyze any one or combination of a region of a photograph, regions of the photograph, pixels of the photograph, pixels of a portion of the photograph, and/or random pixels of the photograph. Each of the triage filters 128 are user-selectable to form a combination that includes the exposure filter 130, dynamic range filter 132, white balance filter 134, sharpness filter 136, vignette filter 138, noise filter 140, and/or other photograph triage filters 142.

At block 1004, each photograph in the group of photographs is analyzed to identify subject matter in the photographs. For example, the photography auto-triage service 102 can include a subject matter filter that analyzes the photographs 116 to identify or detect subject matter in the photographs, such as a human face or any other type of photographic subject matter.

At block 1006, each photograph in the group of photographs is analyzed based on metadata that is associated with a respective photograph. For example, the photography auto-triage service 102 can include a metadata filter that analyzes the photographs 116 based on the photograph metadata 118 that is associated with a respective photograph 116.

At block 1008, a deficient photograph is identified and, at block 1010, the deficient photograph is removed from the group of photographs. For example, the triage filters 128 analyze the group of photographs 116 to identify and remove deficient photographs 122 from the group. This is similar to what a photographer does when reviewing and sorting out likely bad photographs before performing a detailed review of potentially good photographs on a larger display.

At block 1012, a compilation of triage-approved photographs is generated and, at block 1014, a compilation of triage-removed photographs is generated. For example, the photography auto-triage service 102 analyzes the group of photographs 116 and each photograph is then added to either the compilation of triage-removed photographs 124 or added to the compilation of triage-approved photographs 126.

At block 1016, auto-triage assessments are inferred from the triage-removed photographs to learn identifying deficient photographs. For example, the auto-triage assessment module 144 of the photography auto-triage service 102 infers auto-triage assessments from the compilation of triage-removed photographs 124 to learn identifying the deficient photographs 122 and/or the preferences of a particular photographer. In an embodiment, the method continues at block 1002 to repeat analyzing the photographs 116, identifying the deficient photographs 122, and removing each photograph that is identified as deficient from the group of photographs 116.

Figure 11:
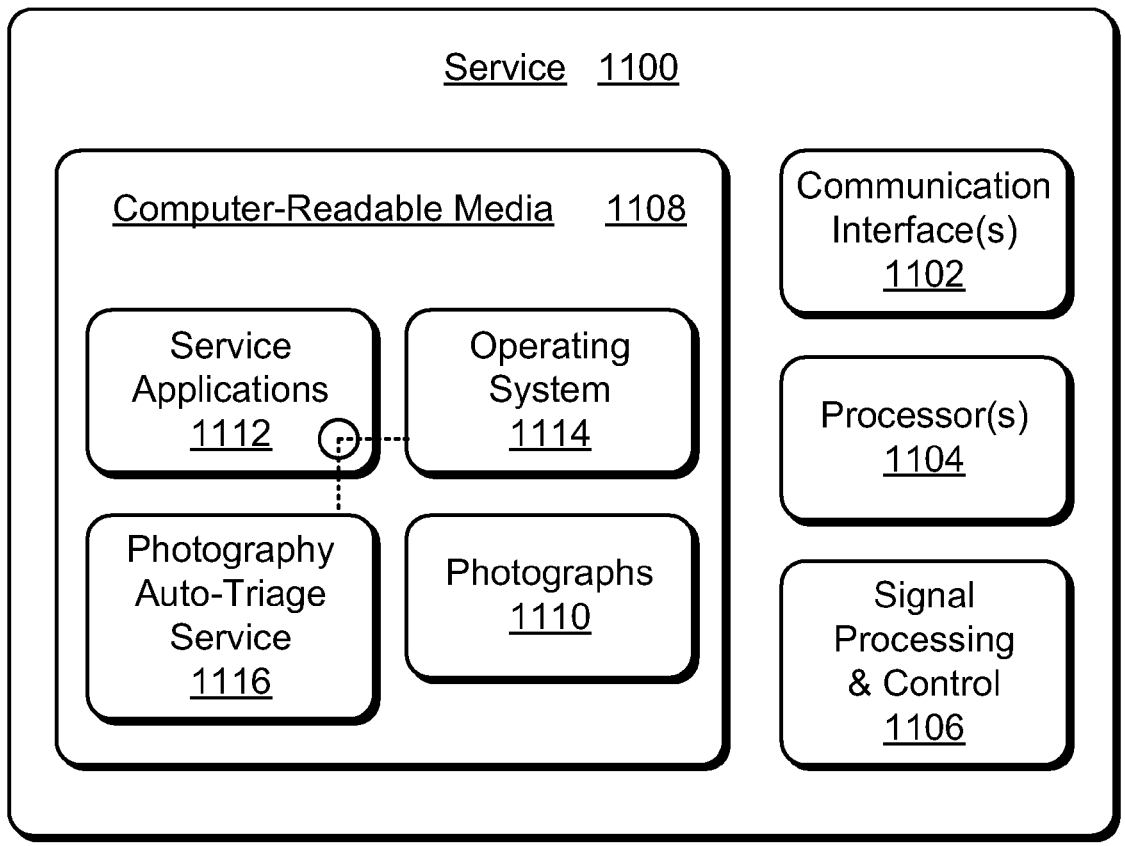
FIG. 11 illustrates various components of an example service that can implement embodiments of photography auto-triage.

FIG. 11 illustrates various components of an example service 1100 that can be implemented as the photography auto-triage service 102 shown in respective FIGS. 1 and 2. Service 1100 can include one or more communication interfaces 1102 that can be implemented as any one or more of a serial and/or parallel interface, a wireless interface, any type of network interface, a modem, and as any other type of communication interface for data communication. The communication interfaces 1102 provide a connection and/or communication links between service 1100 and communication network(s) by which other communication, electronic, and computing devices can communicate with service 1100.

Service 1100 can include one or more processors 1104 (e.g., any of microprocessors, controllers, and the like) which process various computer-executable instructions to control the operation of service 1100 and to implement embodiments of photography auto-triage. Alternatively or in addition, service 1100 can be implemented with any one or combination of hardware, firmware, or fixed logic circuitry that is implemented in connection with signal processing and control circuits generally identified at 1106.

Service 1100 can also include computer-readable media 1108, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 1108 provides data storage mechanisms to store various types of information and/or data related to operational aspects of service 1100, such as photographs 1110, and provides storage for various service applications 1112. For example, an operating system 1114 can be maintained as a computer application with the computer-readable media 1108 and executed on the processors 1104. The service applications 1112 can also include a photography auto-triage service 1116. In this example, the service applications 1112 are shown as software modules and/or computer applications that can implement various embodiments of photography auto-triage.

Although not shown, service 1100 can include a system bus or data transfer system that couples the various components within the service. A system bus can include any one or combination of different bus structures, such as a memory bus or memory controller, a peripheral bus, a universal serial bus, and/or a processor or local bus that utilizes any of a variety of bus architectures.

Figure 12:
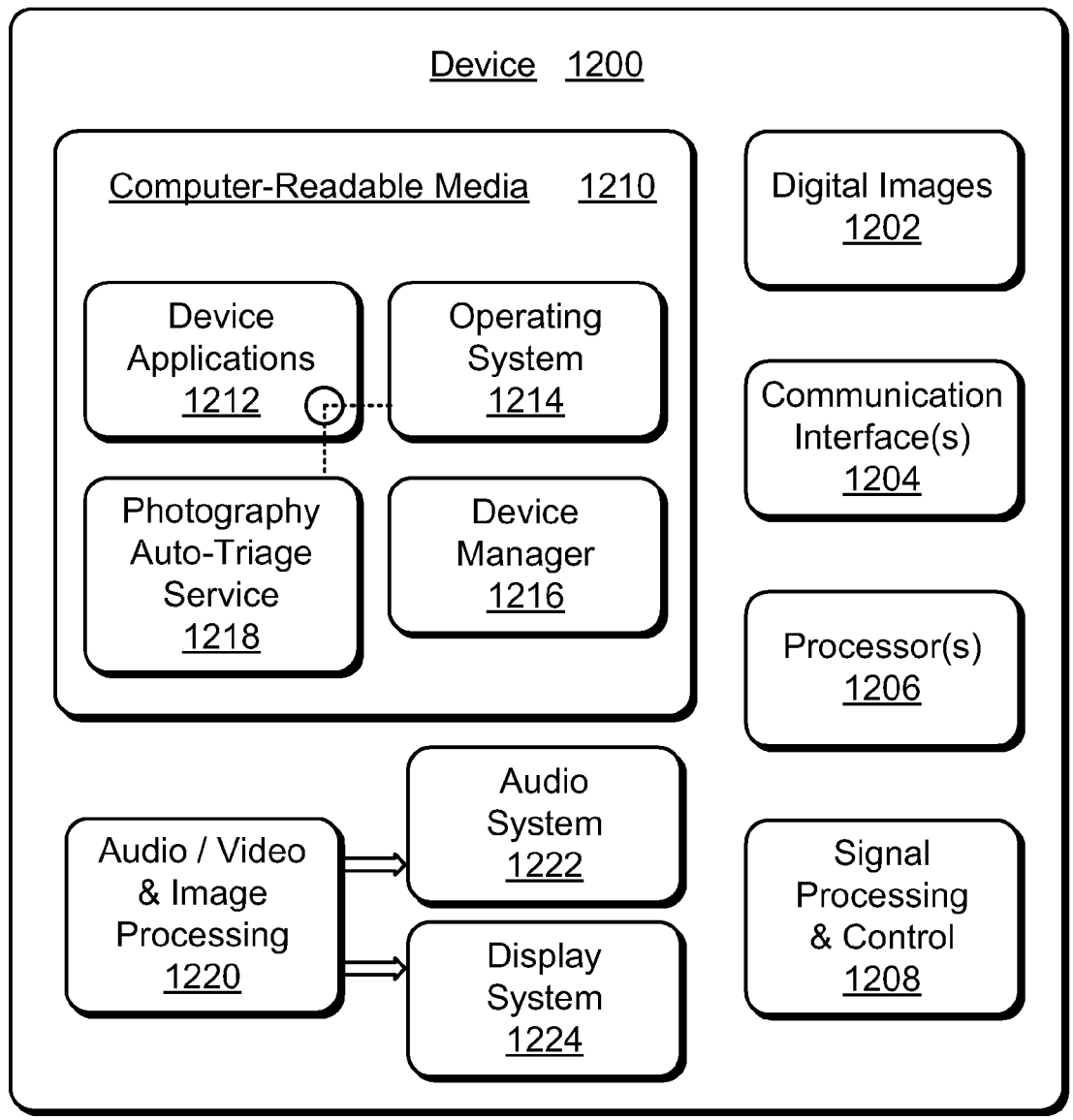
FIG. 12 illustrates various components of an example device that can implement embodiments of photography auto-triage.

FIG. 12 illustrates various components of an example device 1200 that can be implemented as any form of a mobile, computing, electronic, and/or imaging device to implement various embodiments of photography auto-triage. For example, device 1200 can be implemented as a computer device, mobile computing device, or digital camera as shown in FIG. 1 and/or FIG. 2. Device 1200 can include digital images 1202, such as photographs, as well as other data and information associated with the device. Device 1200 further includes one or more communication interfaces 1204 that can be implemented for any type of data communication via communication network(s).

Device 1200 can include one or more processors 1206 (e.g., any of microprocessors, controllers, and the like) which process various computer-executable instructions to control the operation of device 1200 and to implement embodiments of photography auto-triage. Alternatively or in addition, device 1200 can be implemented with any one or combination of hardware, firmware, or fixed logic circuitry that is implemented in connection with signal processing and control circuits which are generally identified at 1208.

Device 1200 can also include computer-readable media 1210, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 1210 provides data storage mechanisms to store the digital images 1202, as well as various device applications 1212 and any other types of information and/or data related to operational aspects of device 1200. For example, an operating system 1214 can be maintained as a computer application with the computer-readable media 1210 and executed on the processors 1208. The device applications 1212 can also include a device manager 1216 and a photography auto-triage service 1218. In this example, the device applications 1212 are shown as software modules and/or computer applications that can implement various embodiments of photography auto-triage.

Device 1200 can also include an audio, video, and/or image processing system 1220 that provides audio data to an audio rendering system 1222 and/or provides video or image data to a display system 1224. The audio rendering system 1222 and/or the display system 1224 can include any devices or components that process, display, and/or otherwise render audio, video, and image data. The audio rendering system 1222 and/or the display system 1224 can be implemented as integrated components of the example device 1200.

Although not shown, device 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Although embodiments of photography auto-triage have been described in language specific to features and/or methods, it is to be understood that the subject of the appended claims is not necessarily limited to the specific features or methods described. Rather, the specific features and methods are disclosed as example implementations of photography auto-triage.

The invention claimed is:

1. A method, comprising:
analyzing at least a portion of each photograph in a group of photographs with triage filters of an auto-triage service, said analyzing based at least in part on metadata that is generated when each photograph is taken;
identifying deficient photographs in the group of photographs;
removing the deficient photographs from the group of photographs;
inferring auto-triage assessments from the deficient photographs to learn preferences for said identifying and removing additional auto-triaged deficient photographs; and
determining a user threshold of acceptable photographs based on either one or more of the deficient photographs that are subsequently identified as user-approved photographs, or one or more triage-approved photographs that are subsequently identified as user-removed photographs.

2. A method as recited in claim 1, further comprising repeating said analyzing, identifying, removing, and inferring for each deficient photograph in the group of photographs.

3. A method as recited in claim 1, further comprising generating a compilation of triage-approved photographs.

4. A method as recited in claim 1, wherein each of the triage filters are user-selectable to initiate a combination that includes one or more of an exposure filter, a dynamic range filter, a white balance filter, a sharpness filter, a vignette filter, and a noise filter.

5. A method as recited in claim 1, wherein analyzing at least a portion of each photograph in the group of photographs includes analyzing one or more of a region of a photograph, regions of the photograph, pixels of the photograph, pixels of the portion of the photograph, and random pixels of the photograph.

6. A method as recited in claim 1, further comprising analyzing each photograph in the group of photographs to identify subject matter in the photographs.

7. A photography auto-triage system, comprising:
   triage filters configured to analyze at least a portion of each photograph in a group of photographs to identify and remove deficient photographs from the group of photographs, the triage filters configured to analyze at least one of a region of a photograph, regions of the photograph, pixels of the photograph, pixels of the portion of the photograph, or random pixels of the photograph;
   an auto-triage user interface configured to display a compilation of triage-approved photographs that remain in the group of photographs after the deficient photographs are removed;
   an assessment module configured to:
      infer auto-triage assessments from the deficient photographs to learn preferences for identifying additional auto-triaged deficient photographs; and
      determine a user threshold of acceptable photographs based on one or more of the deficient photographs that are subsequently identified as user-approved photographs.

8. A photography auto-triage system as recited in claim 7, wherein the auto-triage user interface is further configured to display an additional compilation of triage-removed photographs.

9. A photography auto-triage system as recited in claim 7, wherein the triage filters are combined to include one or more of an exposure filter, a dynamic range filter, a white balance filter, a sharpness filter, a vignette filter, and a noise filter.

10. A photography auto-triage system as recited in claim 7, further comprising a subject matter filter configured to analyze each photograph in the group of photographs to identify subject matter in the photographs.

11. A photography auto-triage system as recited in claim 7, further comprising a metadata filter configured to analyze each photograph in the group of photographs based on metadata that is generated when each photograph is taken.

12. One or more computer-readable storage media devices comprising computer-executable instructions that, when executed, initiate a photography auto-triage service to:
   generate a compilation of triage-approved photographs from a group of photographs;
   generate a compilation of triage-removed photographs from the group of photographs;
   remove the triage-removed photographs as deficient photographs from the group of photographs;
   infer auto-triage assessments from the deficient photographs to learn preferences for identifying additional auto-triaged deficient photographs; and
   determine a user threshold of acceptable photographs based on:
      one or more of the deficient photographs that are subsequently identified as user-approved photographs; or
      one or more of the triage-approved photographs that are subsequently identified as user-removed photographs.

13. One or more computer-readable storage media devices as recited in claim 12, further comprising computer-executable instructions that, when executed, initiate the photography auto-triage service to:
   analyze one or more of a region of a photograph, regions of the photograph, pixels of the photograph, pixels of the portion of the photograph, and random pixels of the photograph; and
   determine a user preference based on every pixel of the photograph analyzed for accuracy or a randomly selected subset of the pixels of the photograph analyzed for speed.

14. One or more computer-readable storage media devices as recited in claim 12, further comprising computer-executable instructions that, when executed, initiate the photography auto-triage service to analyze each photograph in the group of photographs based on metadata that is generated when each photograph is taken.

15. A method as recited in claim 1, wherein the photographs are further analyzed for one of accuracy or speed, and wherein every pixel of a photograph is analyzed for accuracy, or a randomly selected subset of the pixels of the photograph are analyzed for speed.

16. A photography auto-triage system as recited in claim 7, wherein the assessment module is further configured to determine the user threshold of acceptable photographs based on one or more of the triage-approved photographs that are subsequently identified as user-removed photographs.

17. A photography auto-triage system as recited in claim 7, wherein the photographs are further analyzed for one of accuracy or speed, and wherein every pixel of the photograph is analyzed for accuracy, or a randomly selected subset of the pixels of the photograph are analyzed for speed.

18. One or more computer-readable storage media devices as recited in claim 12, further comprising computer-executable instructions that, when executed, initiate the photography auto-triage service to combine two or more triage filters that are user-selectable to analyze at least a portion of each photograph in a group of photographs to identify deficient photographs, the two or more triage filters combined to include one or more of an exposure filter, a dynamic range filter, a white balance filter, a sharpness filter, a vignette filter, and a noise filter.

* * * * *